United States Patent [19]

Valade

[11] 4,131,268
[45] Dec. 26, 1978

[54] RADIATOR CORE SUPPORT DEVICE

[76] Inventor: Gerard Valade, 23 Cliff Ave., Old Orchard Beach, Me. 04064

[21] Appl. No.: 913,952

[22] Filed: Jun. 9, 1978

[51] Int. Cl.$^2$ ............................................. B23Q 3/02
[52] U.S. Cl. ..................................... 269/47; 248/232; 269/95; 269/321 W
[58] Field of Search .............................. 269/47, 97–98, 269/321 W, 95; 248/232–234

[56] References Cited
U.S. PATENT DOCUMENTS

| | | | |
|---|---|---|---|
| 3,123,170 | 3/1964 | Bryant | 248/232 X |
| 3,588,083 | 6/1971 | Callanan | 269/98 |
| 3,815,893 | 6/1974 | Engels | 269/98 |

*Primary Examiner*—Robert C. Watson
*Attorney, Agent, or Firm*—William Nitkin

[57] ABSTRACT

A radiator core support device adapted for use upon the sides of a radiator testing tank comprising a base member, inner wall retainer members affixed to the base member, outer wall retainer members affixed to the base member, and a header lip catch member affixed to the base member extending therefrom at an angle and having defined along its upper edge a pair of header apertures and a clamp aperture.

4 Claims, 3 Drawing Figures

RADIATOR CORE SUPPORT DEVICE

BACKGROUND OF THE INVENTION

1. Field of the Invention

The device of this invention resides in the area of radiator repair equipment and more particularly relates to a radiator core supporter utilized in association with radiator testing tanks.

2. History of the Prior Art

In repairing and/or recoreing radiators of the type used in motor vehicles for cooling or heating systems, one usually utilizes a radiator testing tank containing fluid to check for leaks by submersing the radiator core beneath the fluid and pumping air through its tubes. Once a radiator core is deemed usable, radiator tank members must be soldered thereto on the top and bottom of the core at its junction with the core's header members. Current practice utilizes a retractable rack which can be pulled out from under the radiator testing tank for the radiator core to rest on while such soldering of the radiator tanks is being performed. The radiator is usually positioned at a slight angle on the rack and so that its top rests against the radiator testing tank's side wall, and the radiator tank is positioned over the topmost header of the core and soldered in place. The core is then turned upside down and the other radiator tank is soldered to the other header of the core. One problem that arises is that the bottom of the radiator core often slides forward and falls off the retractable rack causing the radiator to fall on the ground, and in some cases against the tank or radiator rack resulting in damage to the delicate cooling fins which surround the tubes within the radiator core or in damage to other parts of the radiator. Also, because of the core's predilection to moving and sliding while positioned on the retractable rack, difficulties can be encountered in soldering due to movement of the workpiece.

SUMMARY OF THE INVENTION

It is an object of this invention to provide a novel radiator core supporter which has substantial advantages over the retractable rack discussed above and which is particularly adapted for utilization with radiator testing tanks. The device of this invention securely holds the radiator core for working thereon and for the soldering of tanks thereto in a convenient position. Further the device of this invention is adapted to be slidably movable along the side of the radiator testing tank at the wishes of and convenience of the user. The radiator core supporter of this invention has retainer members which allow it to be fitted over a side of the radiator testing tank and which retainer members are affixed to and which extends downward from a base member. Two inner wall retainer members are positioned on one side of the base member and on the other side of the base member are two outer wall retainer members. This structure is adapted to be fitted over the side of the radiator testing tank and to be slidably movable thereon by applying lateral force so that it can be repositioned in various areas along that side for the user's convenience in using particular tools such as torches, hoses and lights as may be necessary to reach and work on the radiator core. Extending at an angle from the base member is a header lip catch member. This portion is adapted to catch a radiator core header lip when the header lip is placed thereon. The radiator core then hangs downward parallel to the side of the tank, being vertically positioned so that radiator tanks can be soldered thereon. The header lip catch member has defined therein two header apertures and a centrally located clamp aperture. The header apertures are positioned so that when smaller radiators are put on the radiator core supporter and their header is caught on the header lip catch member, the edge of the header lip which curves around to the side of the core does not rest on top of the header lip catch member causing instability but is adapted in certain size radiator cores to pass through the header apertures. Longer radiators may have their header lip end curves extending beyond either end of the header lip catch member, the header lip catch member's length and header apertures being adapted to accommodate most standard radiator sizes for use therewith. The clamp aperture allows a clamp to be positioned from the top of the tank around both sides of the header so that it can tightly hold a radiator tank to the core's header for soldering thereon.

Therefore it is a further object of this invention to provide a radiator core supporter which will securely support a radiator core in position for the soldering of a radiator tank to each end thereof when the core is suspended from the header lip catch member.

It is yet a further object of this invention to provide a slidably movable radiator core supporter so that the radiator core when being worked upon can be placed in a variety of different positions along a side of the radiator testing tank.

The objects and advantages of this invention will become clearer with reference to the following drawings and Description of the Preferred Embodiment.

DESCRIPTION OF THE PREFERRED EMBODIMENT

Figure 1:
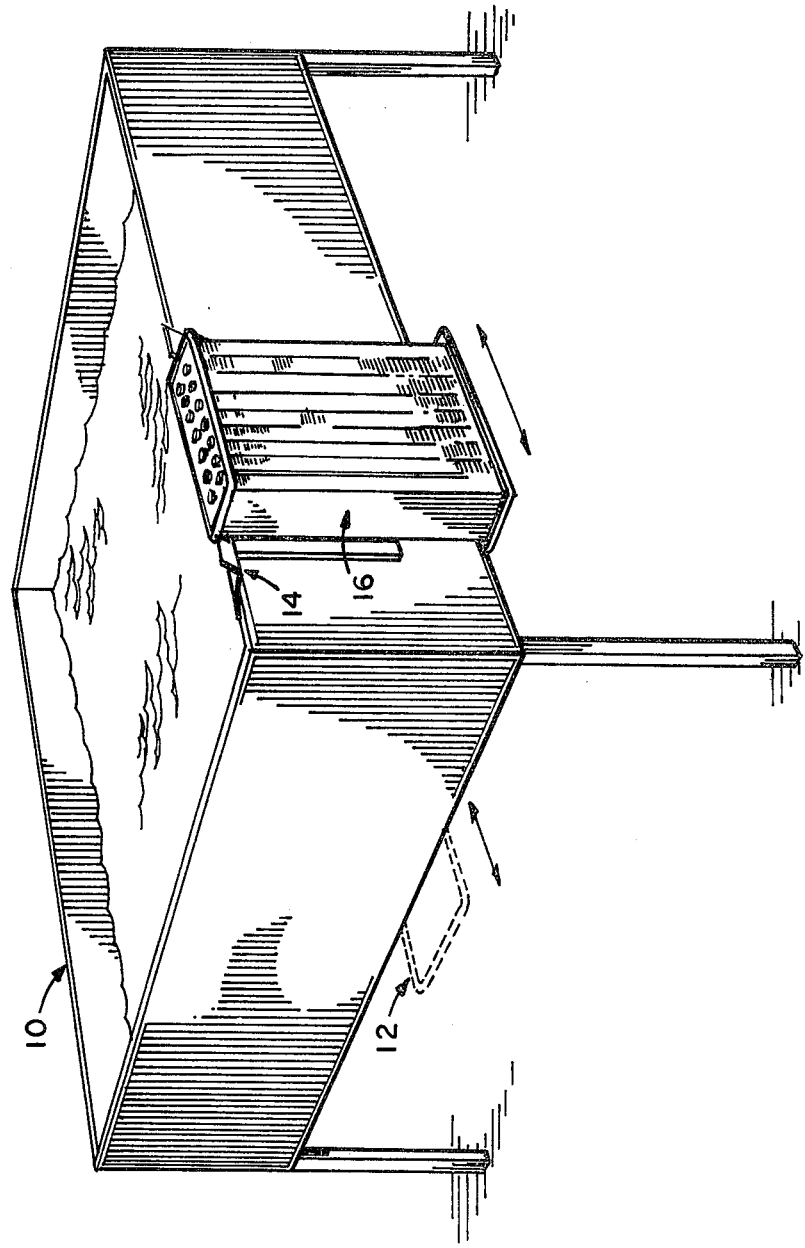
FIG. 1 illustrates a perspective view of a radiator testing tank showing the prior art retractable rack illustrated in outline form and the device of this invention supporting a radiator core thereon.

FIG. 1 illustrates a radiator testing tank 10 containing water or other fluids used to check for the structural integrity of the radiator core's tube members to see that they are airtight. Seen extending from a side of radiator testing tank 10 is the prior art retractable rack 12 shown in outline form for supporting the radiator outside the tank. This retractable rack 12, mentioned in the prior art section, is shown to illustrate what is currently utilized on which to rest a radiator while it is being worked upon. Seen upon the other side of the radiator testing tank is the device of this invention, radiator core supporter 14, and suspended therefrom is radiator core 16. It should be noted that radiator core supporter 14 can be positioned anywhere along any side of the radiator testing tank and once positioned upon a side, it can be slid on that side to and fro so that it can be easily positioned by the worker for performance of operations on the radiator core.

Figure 2:
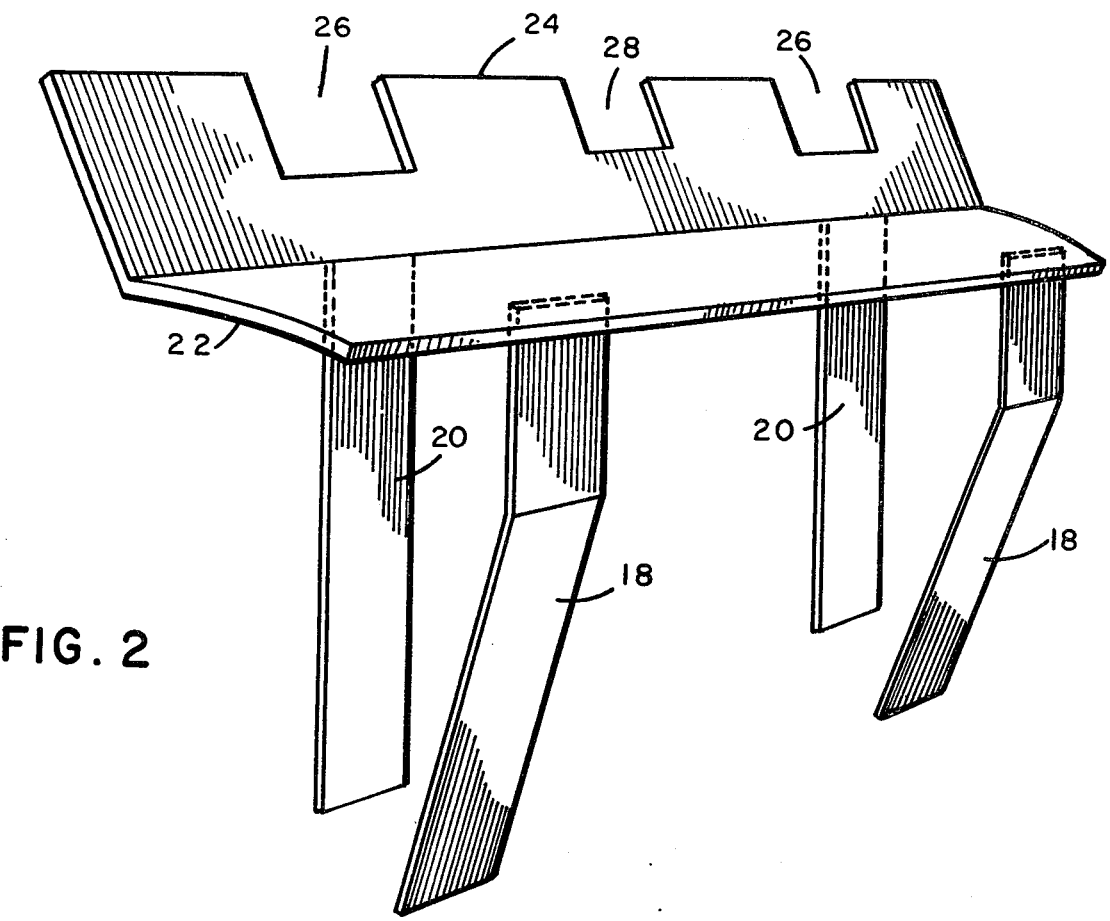
FIG. 2 illustrates a perspective view of the device of this invention.
Figure 3:
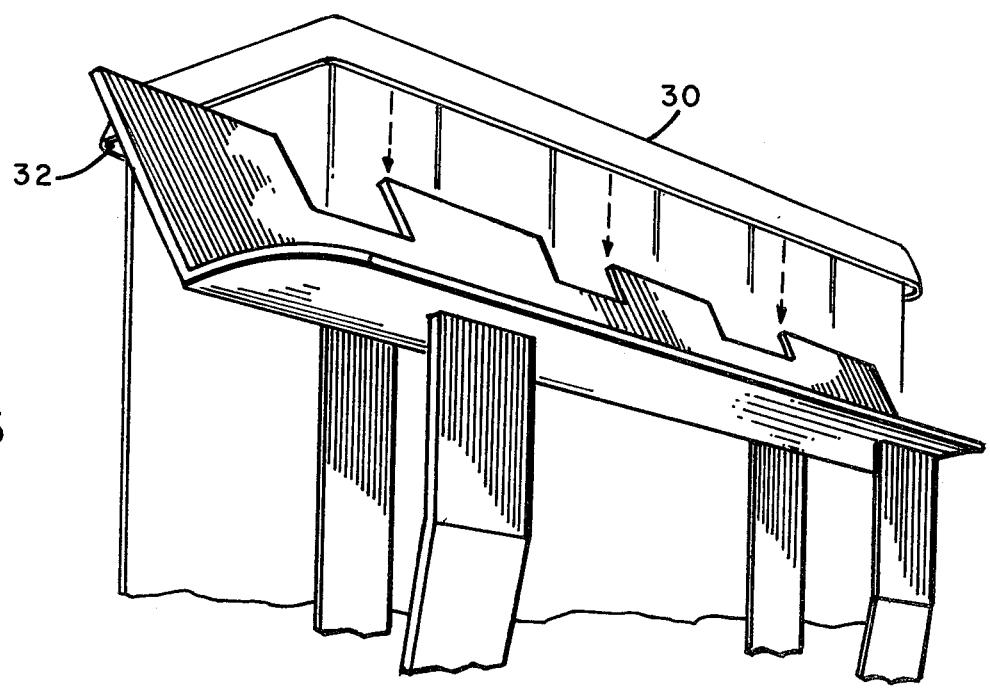
FIG. 3 illustrates an enlarged sectional view of the device of this invention with radiator core suspended thereon.

FIG. 2 illustrates a perspective view of the device of this invention radiator core supporter 14. Seen in this view are inner wall retainer members 18 and outer wall retainer members 20 both of which are affixed to base member 22. The inner wall retainer members 18 and outer wall retainer members 20 are adapted to be lifted above the radiator testing tank wall and slid down so that they are on either side of the radiator testing tank wall. The inner wall retainer members 18 are angularly bent at a position along their lengths and extend toward outer wall retainer members 20 so as to allow base member 22 to rest on the top of the side of the radiator testing tank while at the same time coming together at a lower point to prevent movement back and forth and allowing lateral sliding movement if desired by the user upon the exertion of lateral forces such as manual pushing to and fro along the side of the tank. The angles of bend of the inner wall retainer members 18 allow the radiator core supporter 14 to be slipped over the edge lip of the radiator testing tank which in many instances has a 1.5 inch flange around its top. Further stability is achieved by having the inner wall retainer members extend a greater distance than the outer wall retainer members so that when pressure is placed upon the header lip catch member, the radiator core supporter 14 has less tendency to tilt forward or backward. Header lip catch member 24 is affixed to base member 22 and extends at an angle which is greater than 90° but less than 180° therefrom. This angle allows a radiator core header which has a small lip section running along its inner edge around the radiator core to be suspended from the upper edge of header lip catch member 24 and allows the radiator to be worked on without portions thereof being obscured or in any way covered by the core supporter so that all sections of the header can be soldered to radiator tank member 30 which is adapted to be affixed thereto. Header lip catch member 24 has defined therein two header apertures which are spaced apart approximately 15 inches from one another. It has been found that a suitable length for the header lip catch member is 23 inches. These header apertures 26 allow for the utilization of the radiator core supporter with a variety of radiator cores of different lengths. Each radiator has a header member which curves around to the side wherein the lip portion, if the corner thereof were rested upon the top portion of the header lip catch member 24, would not securely allow the header lip catch member to reach into the lip area for proper retention and support of the radiator core. Therefore it is desirable that the corners of the header member where the lip curves to the sides be positioned in one of the header apertures or beyond the ends of header lip catch member 24. For example smaller radiators such as utilized in heating systems of automobiles may have the corners of their header where the lip curves to the side resting within the header apertures. A radiator core that is somewhat longer may have one of its header lip corners resting in one of the header apertures while the other corner extends beyond the header lip catch member such as illustrated in FIG. 3. Radiators where the corners are longer than the header lip catch member will be supported with the header lip catch member merely inserted under the header lip and the corners both extending beyond each end of the header lip catch member. Centrally defined in the header lip catch member is a clamp aperture 28. This aperture is adapted to receive an arm of the clamp which is utilized to position and hold a radiator tank 30 onto the header so that it may be soldered in position around its junction with the header for completion of the radiator unit and allows for the arm position of the clamp to pass through the header lip catch member and properly engage the radiator core header lip 32. It should be noted that the angle that the header lip catch member extends from the base member is important to the operation of this invention, the angle illustrated being greater than 90°. Such an angle allows for the radiator core to hang down from the header lip catch member somewhat away from the side of the radiator testing tank and outer wall retainer members 20. This separation allows for certain backward and forward movement as the core can swing where it contacts the header lip catch member so that the radiator core can be pushed away from the user inward toward the radiator testing tank or can be swung outward from the tank at an angle thereto so that the fins or tubes can be worked upon or examined without a worker having to bend significantly to observe them and can be put in a better relation to a fixed spotlight for careful study and illumination. It should also be noted that base member 22 can slope downward toward the radiator testing tank and can further have a portion thereof extend beyond the inner wall retainer members to facilitate solder rolling off the base member and into the testing tank.

Although the present invention has been described with reference to particular embodiments, it will be apparent to those skilled in the art that variations and modifications can be substituted therefor without departing from the principles and spirit of the invention.

I claim:

1. A radiator core support device adapted for use upon the sides of a radiator testing tank comprising:
   a base member;
   a first inner wall retainer member affixed to said base member;
   a first outer wall retainer member affixed to said base member on an opposite side from said inner wall retainer member spaced apart from said inner wall retainer member a distance sufficient to allow a side of said radiator testing tank to pass therebetween;
   a header lip catch member affixed to said base member and extending therefrom at an angle thereto;
   a pair of header apertures defined along the upper edge of said header lip catch member; and
   a clamp aperture centrally defined along the upper edge of said header lip catch member, said device adapted to be slidably movable along the side of said radiator testing tank and adapted to support a radiator core when suspended therefrom.

2. The device of claim 1 further including:
   a second inner wall retainer member affixed to said base member parallel to said first inner wall retainer member; and
   a second outer wall retainer member affixed to said base member parallel to said first outer wall retainer member.

3. The device of claim 1 wherein said header lip catch member extends at an angle from said base member between 90°–180° thereto.

4. The device of claim 1 wherein said base member slopes downward toward the inside of said radiator testing tank.

* * * * *